US009230289B2

(12) United States Patent
Omitaomu et al.

(10) Patent No.: US 9,230,289 B2
(45) Date of Patent: Jan. 5, 2016

(54) METHOD FOR ESTIMATING POWER OUTAGES AND RESTORATION DURING NATURAL AND MAN-MADE EVENTS

(75) Inventors: Olufemi A. Omitaomu, Knoxville, TN (US); Steven J. Fernandez, Knoxville, TN (US)

(73) Assignees: U.S. Department of Energy, Washington, DC (US); UT-Battelle, LLC, Oak Ridge, TN (US)

( * ) Notice: Subject to any disclaimer, the term of this patent is extended or adjusted under 35 U.S.C. 154(b) by 699 days.

(21) Appl. No.: 13/443,943

(22) Filed: Apr. 11, 2012

(65) Prior Publication Data

US 2012/0265502 A1    Oct. 18, 2012

Related U.S. Application Data

(60) Provisional application No. 61/474,956, filed on Apr. 13, 2011.

(51) Int. Cl.
| | |
|---|---|
| *G06F 7/60* | (2006.01) |
| *G06F 17/10* | (2006.01) |
| *G06Q 50/06* | (2012.01) |
| *H02J 3/00* | (2006.01) |
| *H02J 13/00* | (2006.01) |

(52) U.S. Cl.
CPC ............. *G06Q 50/06* (2013.01); *H02J 3/006* (2013.01); *H02J 13/0006* (2013.01); *H02J 2003/007* (2013.01); *Y02E 60/723* (2013.01); *Y02E 60/76* (2013.01); *Y04S 10/16* (2013.01); *Y04S 10/525* (2013.01); *Y04S 40/22* (2013.01)

(58) Field of Classification Search
CPC ......... G01W 1/06; G01W 1/10; G06Q 50/06; G06Q 30/0205; H02J 3/006; H02J 13/0006; H02J 2003/007; Y02E 60/723; Y02E 60/76; Y04S 10/16; Y04S 10/525; Y04S 10/54; Y04S 20/40; Y04S 40/22

See application file for complete search history.

(56) References Cited

U.S. PATENT DOCUMENTS

| | | | | |
|---|---|---|---|---|
| 8,521,337 | B1 * | 8/2013 | Johnson | ............... 700/297 |
| 2008/0319724 | A1 * | 12/2008 | Domijan et al. | ............... 703/2 |
| 2010/0131202 | A1 * | 5/2010 | Dannevik et al. | ............... 702/3 |

OTHER PUBLICATIONS

"2010 AFIT-AFRL Symposium on Rapid Product Development Research: Call for Contributions and Participation", 2010.*
Castongia, A Demand-Based Resource Allocation Method for Electrical Substation Service Area Delineation, 2006.*
(Continued)

*Primary Examiner* — Aniss Chad
(74) *Attorney, Agent, or Firm* — Pauley Erickson & Kottis

(57) ABSTRACT

A method of modeling electric supply and demand with a data processor in combination with a recordable medium, and for estimating spatial distribution of electric power outages and affected populations. A geographic area is divided into cells to form a matrix. Within the matrix, supply cells are identified as containing electric substations and demand cells are identified as including electricity customers. Demand cells of the matrix are associated with the supply cells as a function of the capacity of each of the supply cells and the proximity and/or electricity demand of each of the demand cells. The method includes estimating a power outage by applying disaster event prediction information to the matrix, and estimating power restoration using the supply and demand cell information of the matrix and standardized and historical restoration information.

8 Claims, 6 Drawing Sheets

(56) References Cited

OTHER PUBLICATIONS

Dowell et al., Simulating Earthquake Damage to the Electric-Power Infrastructure: A Case Study for Urban Planning and Policy Development, Los Alamos National Laboratory Technical Report LA-UR-00-3777, 2000.*

"Femi Omitaomu", Retrieved: http://web.ornl.gov/~7f3/publication.html on Aug. 4, 2014.*

Fenwick et al., Electrical Substation Service-Area Estimation Using Cellular Automata: An Initial Report, 1998.*

Omitaomu et al., A Methodology for Enhancing Emergency Preparedness during Extreme Weather Conditions, Proceedings of the 3rd Annual AFIT/WSU Mid-West CBRNE Symposium, Wright-Peterson Air Force Base, Sep. 22-23, 2009.*

Omitaomu et al., Estimating the Spatial Distribution of Population without Power During Extreme Weather Events, Presented at the 2010 Annual Meeting of the Association of American Geographers, Washington DC, Apr. 14-18, 2010.*

Omitaomu et al., Data Product for Situational Awareness of the Electric Grid System, Proceedings of the AFIT-AFRL Product Development Research Symposium.*

Young, Dynamic Modeling of Components of the Electric Grid, ORNL/TM-0000/00, Oak Ridge National Laboratory, Aug. 14, 2009.*

* cited by examiner

Fig. 2

|   | 2 |   |   |   |   |   | 3 | 4 |
|---|---|---|---|---|---|---|---|---|
| 5 | 2, 20 | 3 | 6 |   |   |   | 1, 10 | 5 | 5 |
|   |   |   |   |   |   |   |   |   |
| 1 | 1 |   |   |   |   | 10 | 2 |   |
|   | 2 | 4 |   |   |   | 5 | 5, 30 | 3 |   |
| 5 | 2 | 3 | 6 |   |   |   | 1 | 1 |
|   | 5 | 4, 40 | 6 |   |   |   | 1 |   |
| 5 |   |   | 3 |   | 3 |   |   |   |

Fig. 3

|   | 2 |   |   |   |   |   | 3 | 4 |
|---|---|---|---|---|---|---|---|---|
| 5 | 2, 18 | 3 | 6 |   |   |   | 1, 9 | 5 | 5 |
|   |   |   |   |   |   |   |   |   |
| 1 | 1 |   |   |   |   | 10 | 2 |   |
|   | 2 | 4 |   |   |   | 5 | 5, 25 | 3 |   |
| 5 | 2 | 3 | 6 |   |   |   | 1 | 1 |
|   | 5 | 4, 36 | 6 |   |   |   | 1 |   |
| 5 |   |   | 3 |   | 3 |   |   |   |

Fig. 4

|   | 2 |   |   |   |   |   | 3 | 4 |
|---|---|---|---|---|---|---|---|---|
| 5 | 2, 13 | 3 | 6 |   |   |   | 1, 9 | 5 | 5 |
|   |   |   |   |   |   |   |   |   |
| 1 | 1 |   |   |   |   | 10 | 2 |   |
|   | 2 | 4 |   |   |   | 5 | 5, 10 | 3 |   |
| 5 | 2 | 3 | 6 |   |   |   | 1 | 1 |
|   | 5 | 4, 29 | 6 |   |   |   | 1 |   |
| 5 |   |   | 3 |   | 3 |   |   |   |

METHOD FOR ESTIMATING POWER OUTAGES AND RESTORATION DURING NATURAL AND MAN-MADE EVENTS

CROSS REFERENCE TO RELATED APPLICATION

This application claims the benefit of U.S. Provisional Patent Application Ser. No. 61/474,956, filed on 13 Apr. 2011. The Provisional Application is hereby incorporated by reference herein in its entirety and is made a part hereof, including but not limited to those portions which specifically appear hereinafter.

GOVERNMENT RIGHTS

This invention was made with government support under Contract No. DE-AC05-00OR22725 awarded by the U.S. Department of Energy. The government has certain rights in the invention.

FIELD OF THE INVENTION

The present invention relates to a computer-implemented method, and software for executing the method, for modeling electricity supply and demand, and estimating power outages and power restoration time and resource needs.

BACKGROUND OF THE INVENTION

Electricity generation, transmission, and distribution systems include transmission lines and substations between generating plants and the consumers. Substations can perform many functions, and electric power may flow through several substations between the generating plant and the consumer. Natural disaster events, such as severe weather conditions including hurricanes, ice-storms, and tornadoes, as well as technological issues and faults and man-made issues including attacks, have the potential to cause damage to electrical systems including substations and transmission lines. These damages often disrupt electrical services and can result in a massive number of customer outages, taking from days to weeks to repair depending on the condition of the roads leading to the damage areas. As a result, two challenges in emergency preparedness and response, particularly during the hurricane season and other natural disasters are: how to determine the location and number of people that may be losing power and the duration of the power outage. The ability to accurately estimate the number of people that may be losing power in space and time during extreme weather conditions is valuable to emergency responders and utility companies. It helps the emergency responders to determine the number of people that may need their assistance and where they are located, as well as where the first responders need to stage their equipment and staff so that they can move in quickly to begin the recovery process once the extreme weather is over. It also helps the utility companies to determine ahead of time how many repair crews they would need for quickly restoring power, and where those repair crews should be stationed so that they are not delayed or trapped by the conditions on ground.

The spatial locations and capacities of new and existing electric substations are publicly available through the mandatory annual filings with the Federal Energy Regulatory Commission. However, the data do not include information about the geographical areas served by each substation and transmission line. Therefore, there is no mandatory source of information for substations and transmission lines service areas. This information is also not easily obtainable from utility companies due to restrictions on proprietary information. In cases where the utility companies are willing to share the information, there may be a need for a non-disclosure agreement and the requirements and formats of such an agreement vary from one company to another. This will become a huge burden on the partnering organization in view of the fact that there are about 3000 utility companies in the USA. There is a need for an approach that will mimic the distribution system as well as the incremental development of the distribution system.

Furthermore, the ability to predict when power would be restored to an area is generally a function of several factors such as the availability of internal resources (manpower and equipment) and extra resources from other utility companies or contracting agencies. However, the determinations of the number of repair crews and equipment needed depend on the situation on the ground such as, without limitation, the amount of debris that must be removed, the number of hours/days required for the area to be de-flooded, and the severity and coverage of the storm. Even though these numbers can be estimated, utility companies may not have the capability to estimate the size of the storm ahead of time. There is a continuing need for a methodology for estimating restoration time and strategies based on prior knowledge and restoration time from historic storm events.

SUMMARY OF THE INVENTION

A general object of the invention is to provide improved modeling of electric supply and demand, through a geographical matrix that can be used with disaster event information (predicted or actual) to estimate power outages and/or power restoration time and resource needs.

The general object of the invention can be attained, at least in part, through a series of preprogrammed instructions that, when executed by a computing machine, cause the computing machine to perform steps of modeling an electric supply and demand matrix. The steps include creating an electric supply and demand matrix for a geographic area, which is formed of a plurality of cells each representing an electricity service area, and assigning each existing electric substation for the geographic area to one of the cells in which the each existing substation is geographically located. The cells including the substation(s) are considered supply cells. The method also includes determining an electric demand for each of the plurality of cells to create demand cells, and assigning each of the demand cells to one of the supply cells as a function of proximity of the demand cells and an electricity supply of each of the supply cells. The assigning step is repeated until each of the demand cells is assigned to a supply cell or until electricity supply capacity is exhausted.

The matrix divides a geographic area, such as a state, into the service area cells for analysis and estimation of disaster effects on the area. The cells can be sized as needed, and can be, for example, approximately 0.01 decimal degrees per side. The electric demand for each cell can be determined by constructing a per capita electric demand for each cell from peak commercial electricity demand sources and population data sources. For example, the electric demand for each of the cells can be determined by the computer calculating a total population for each cell and constructing an electricity demand per cell by multiplying the sum of all electricity supplied by area substations by the ratio of a total cell population to the total state population.

The method of this invention uses high-resolution population data that the majority of key U.S. and foreign agencies used as their database system for worldwide geospatial distribution of populations. Furthermore, the method of one embodiment of this invention is based on a nearest-neighbor method in which the demand cells of a matrix are acquired based on their proximity to each substation within a fixed spatial radius and the available capability of the respective substation. In some cases, a cell may be assigned to more than one substation to account for incremental development to the distribution system, which is a more realistic assumption for the real world.

The invention further includes a method of modeling electric supply and demand with a data processor in combination with a recordable medium for estimating spatial distribution of electric power outages and affected populations. The method includes dividing a geographic area into cells of a matrix, identifying supply cells including electric substations within the matrix, associating demand cells of the matrix that include electricity customers with at least one of each of the supply cells as a function of the capacity of each of the supply cells and the proximity and/or electricity demand of each of the demand cells, and estimating a power outage by applying disaster event prediction information to the matrix. The computer can further provide a power restoration estimate and/or a restoration plan proposal for the power outage using predicted disaster effects and the matrix, and/or applying standardized repair crew information to power outage information generated using the matrix.

The invention further includes a method of modeling electric supply and demand with a data processor in combination with a recordable medium. The method includes dividing an area into cells to form a matrix, wherein each of the cells represents an electricity service area, identifying a first plurality of cells each including an electric service substation, associating a second plurality of the cells to each of the first plurality of cells to form a service area for each electric service substation, predicting a disaster effect on the electricity service area using disaster event information with respect to the matrix, and creating at least one of an restoration time estimate or a restoration plan proposal using the predicted disaster effect and the matrix.

The method of this invention is implemented by a data processor executing coded instructions stored on a recordable medium. The data processor, which is a computer apparatus, is used to execute a series of commands of the instruction that represent the method steps described herein. The data processor or computer may be a mainframe, a super computer, a PC or Apple® Mac® personal computer, a hand-held device, or a central processing unit known in the art. The data processor or computer is programmed with a series of instructions that, when executed, cause the data processor or computer to perform the method steps as described and claimed herein.

The instructions that are performed are stored on a data storage device. The machine-readable data storage device can be a portable memory device that is readable by the data processor or computer apparatus. Such portable memory device can be a compact disk (CD), digital video disk (DVD), a Flash Drive, any other disk readable by a disk driver embedded or externally connected to a computer, a memory stick, or any other portable storage medium currently available or yet to be invented. Alternately, the machine-readable data storage device can be an embedded component of a computer such as a hard disk or a flash drive of a computer.

The computer and machine-readable data storage device can be a standalone device or a device that is imbedded into a machine or system that uses the instructions for a useful result.

Other objects and advantages will be apparent to those skilled in the art from the following detailed description taken in conjunction with the appended claims and drawings.

BRIEF DESCRIPTION OF THE DRAWINGS

FIGS. 2-6 show a matrix and illustrate a step-by-step implementation of an algorithm for identifying service areas for a geographic area, according to one embodiment of this invention.

DETAILED DESCRIPTION OF THE INVENTION

The present invention provides a method for modeling electricity supply and demand and estimating power outages and/or restoration timeframes. The problem of estimating substation service area can be considered as a variant of a transportation model. In one embodiment of this invention, the method seeks the determination of a distribution (the "transportation") plan of a single commodity, namely electric power, from a number of substations to a number of destinations, namely utility customers. One difference between the method of this invention and the traditional transportation model is that the method of this invention assumes that each destination can only receive its demand from one source (i.e., substation). In optimization, the model of the method of this invention can be considered as an integer optimization model. However, the problem cannot be solved as an optimization model because the invention is not seeking to build a new solution network for the existing electrical substations, but instead to infer the already existing distribution network. Nevertheless, the data for the model must include the level of supply (i.e., power capacity) at each substation and the amount of power demand at each destination. Since the substations are already in existence, a balanced model can be assumed, namely that the total power capacity equals the total power demand. The spatial locations and capacities of existing electric substations can be obtained through the Federal Energy Regulatory Commission (FERC). To obtain the number of electrical customers, high-resolution population databases from LandScan™, available from Oak Ridge National Laboratory, can be used.

LandScan's global population distribution model involves a collection of best available census counts for each country and other primary geospatial input datasets such as land cover, roads, and slope. LandScan includes some of the finest global population data (~1 km resolution) ever produced. LandScan has significantly enhanced the utility and impact of various applications such as counter-terrorism, homeland security, emergency planning and management, consequence analysis, epidemiology, exposure analysis, and urban sprawl detection. LandScan is being extensively used by national and international organizations including the United Nations, the World Health Organization, the Food and Agriculture organization, and several federal agencies in the US and other countries. Another variant of the LandScan global model is the LandScan USA population model. LandScan USA model is based on U.S. Census figures, but at a more detailed spatial resolution (~90 meters resolution) than Census block-groups and the LandScan global model. It also has activity-based population database corresponding to day-time, night-time, and special event population dataset respectively.

Figure 1:
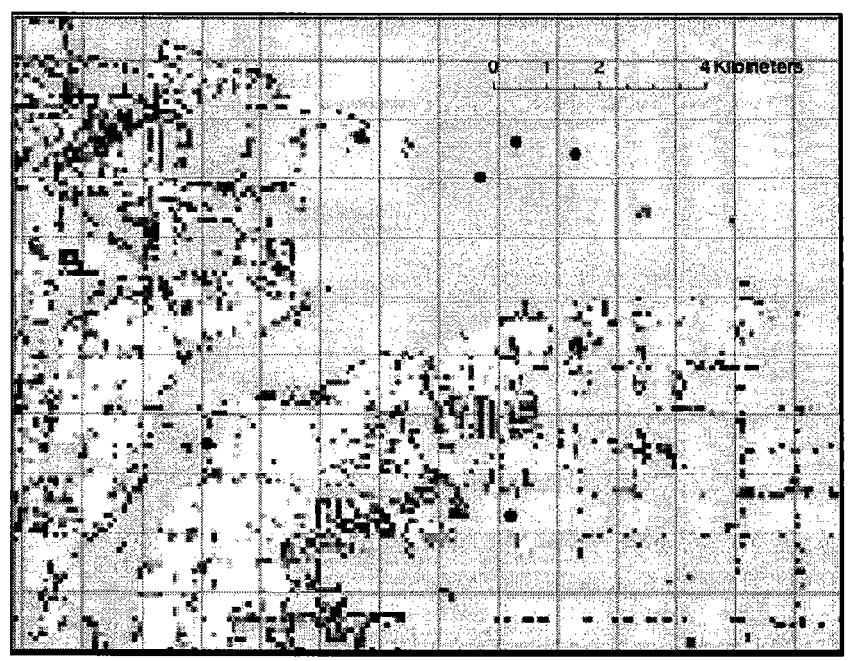
FIG. 1 is a representative matrix for a geographic area, which that is created by the method of one embodiment of this invention.

In one embodiment of this invention, a directional-nearest-neighbor approach is used for acquiring matrix cells based on the availability of power at a substation and the closeness of this substation to where power is actually needed. The approach creates service areas by assigning demand points to each supply point. A first step is to create a supply and demand matrix for the input datasets. In order to reduce computational complexity, the approach can implemented on appropriately sized geographic areas, such as on a state by state basis. A matrix for a representative geographic area, including both demand cells and supply cells, each measuring 0.01 decimal degrees per side (approximately 1 km), is depicted in FIG. 1.

The demand in each square cell D is defined as:

$$D_{ijk} = \frac{A_{ijk}}{\sum_{i,j} P_k} \left( \sum_{i,j} S_k \right),$$

where $A_{ijk}$ is the total population in cell i,j position and state k, $P_k$ is the total population in state k, and $S_k$ is the total available substation capacity in state k. The supply in each cell ($C_{ijk}^T$) is defined as:

$$C_{ijk}^T = \Sigma C_{ijk},$$

where $C_{ijk}$ is the available capacity of each substation in i,j position of state k, and T is the step of iteration. If there is more than one substation in a cell, the capacity of the substations are added together for that supply cell. This can introduce some uncertainty into the methodology, but as only few instances of two substations in one cell are seen in each state, this does not have much, if any, affect on the accuracy of the method.

In one embodiment of this invention, in addition to the demand cells and supply cells, the method also identifies or creates taboo regions. Taboo regions represent areas that violate common engineering principles for power distribution system, and can be represented as a full cell in the matrix, or a portion of a cell. As an illustration, power cannot typically be supplied from one side of a mountain to the other side to avoid power loss. The same constraint holds for customers on different sides of rivers and other reserved spatial areas. Furthermore, substations cannot supply power to customers that are located at a distance beyond a set distance threshold in order to avoid power loss due to long distance of power transport. With the input data calculated and the threshold and taboo regions set, the method of this invention assigns demand cells to each supply cell until there is no available capability to assign or one of the constraints is met.

In one embodiment of this invention, the neighborhood of range r for implementing the algorithm is defined as:

$$N_{(i_0,j_0)} = \{(i,j): |i-i_0|=r, |j-j_0|=r\},$$

where r=0, 1, 2, ..., M is the stage of iteration, $i_0,j_0$ is the location of the supply source of interest, and N is the number of acquired cells in a specific range. The substation cells acquire demand cells based on their ranked proximity and the available capacity. In one embodiment of this invention, based on prior engineering information, the association of demand cells to supply cells to create a substation service area begins west of each substation, and proceeds in a clockwise direction. For each run of demand cell association or acquisition, the proximity of the available demand cells are ranked and assigned to the substation that is closest. This trend is continued until all demand cells have been assigned or all supply capacity of the supply cell has been used up. In situations where there is more than one feasible substation for a demand cell, the demand cell can be randomly assigned to one of the substations. FIGS. 2-6 illustrate the steps for implementing the algorithm presented in pictorial form.

FIG. 2 illustrates a hypothetical, representative electric supply and demand matrix for a geographic area. The matrix including a plurality of cells, where each of the cells represents an electricity service area. The matrix includes four cells where substations are located. The substation cells are each designated as supply cell, but are also demand cells (e.g., combined supply and demand cells) due to electricity customers also being located within these cells. The four substations are each given a supply point value (e.g., 10, 20, 30, and 40) corresponding to the electric capacity of that substation. Each demand cell includes a numerical electric demand, such as can be determined as discussed above.

Figures 5, 6:
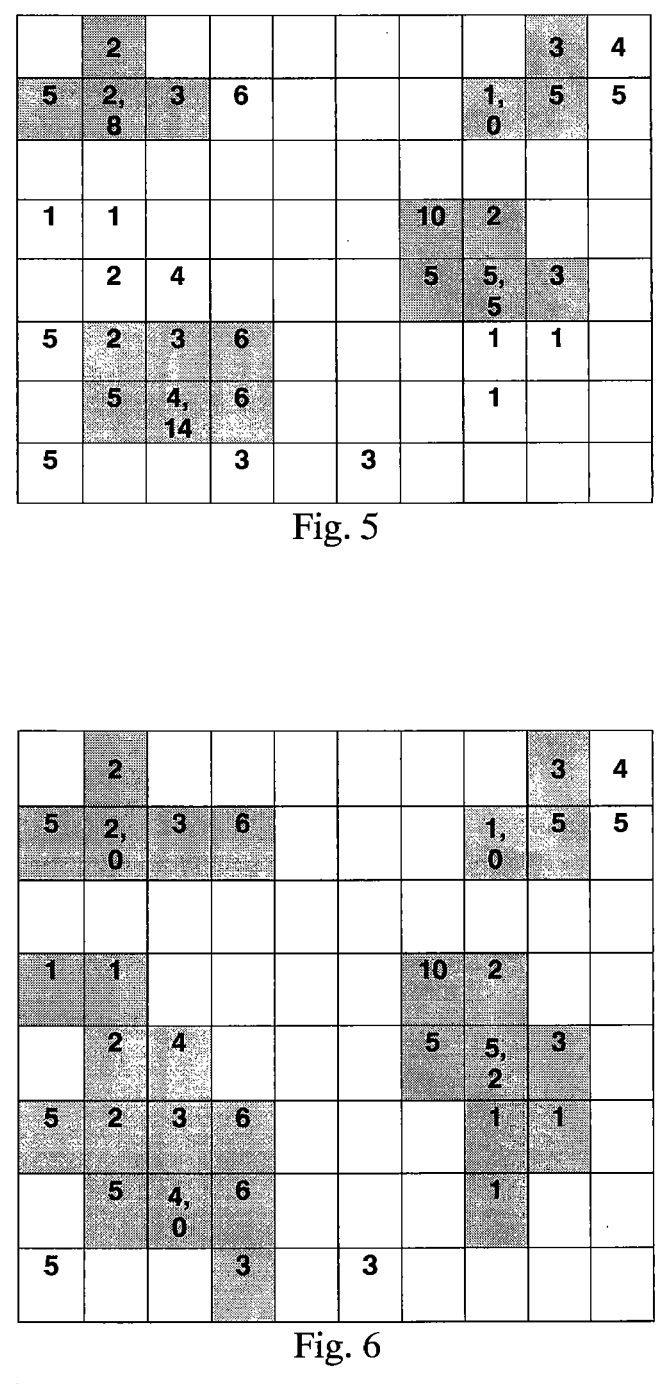

FIGS. 3-6 illustrate a process of assigning each of the demand cells to one of the supply cells. The assigning process shown in FIGS. 3-6 operates on the basis of the proximity of the demand cells and an electricity supply of each of the supply cells. In the first iteration of FIG. 3, the electric demand of the combined supply and demand cell is reduced from the available supply capacity value of the substation. Referring to the upper left substation of FIG. 3, the demand value of 2 is subtracted from the supply value of 20, resulting in a new or remaining supply value of 18. In FIG. 4, the process proceeds to the demand cell to the left (e.g., West) of the supply cell, and then clockwise as a function of demand cell proximity. In FIG. 5, the available capacity of one supply source (upper right corner) is exhausted down to zero and the assignment iteration for that supply cell stops. FIG. 6 shows the end of the iteration assignment process for these substations. The capacity of three of the four sources is zero. One source has a capacity of 2, but there no demand cell that meets this supply constraint in this shown matrix, and the end of the assignment process is reached. Referring to FIG. 6, in a Moore's neighborhood approach the unassigned lower left corner demand cell "5" is considered two cells away from the nearest acquired cell (one down and one left), whereas the demand cell "5" that is two cells above the corner demand cell is only one cell away from an acquired cell. In the embodiment of FIG. 6, cells are not acquired diagonally. Also, in a real-world operation, such as in the U.S.A., it is practical to only have unassigned cells in taboo regions such as waterways, desert or park areas, etc. In FIG. 6, for example, the demand cells not yet assigned would desirably be assigned to additional supply cells, for example, outside of the representative figure.

In one embodiment of this invention, the method and matrix are used to estimate a power outage and/or restoration information by applying disaster event prediction information to the matrix. The method includes predicting a power outage effect on the electricity service area represented by cells of the matrix using disaster event information with respect to the matrix. Disaster event information, whether predicted or actual, can be mapped or otherwise applied to the matrix to obtain a prediction of disaster event effects, or to map actual damage and plan or determine restoration strategies. For hurricane or other weather events, the storm tracking and prediction information can be automatically computed and tracked with respect to the matrix to determine substations in the event path.

Figure 7:
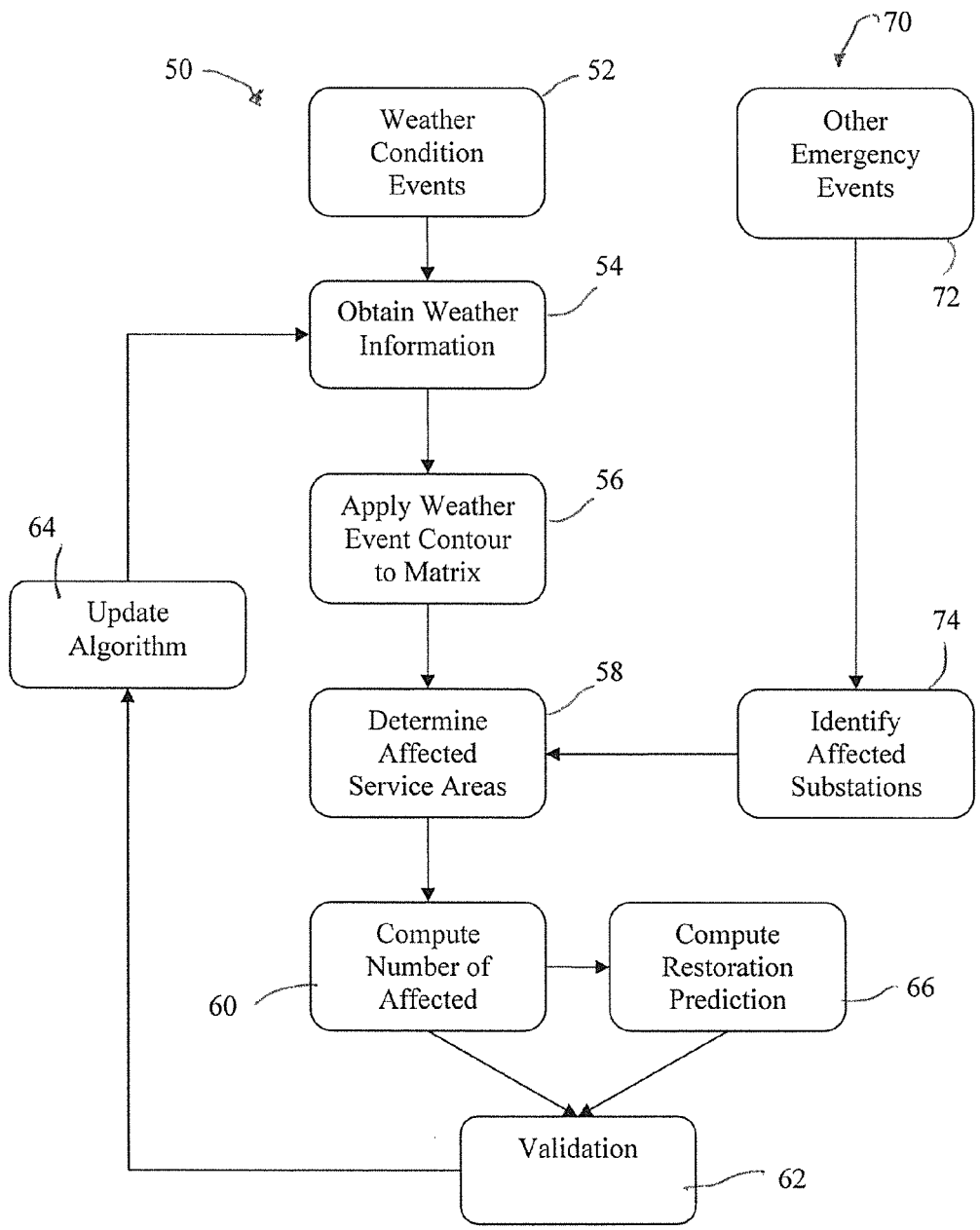
FIG. 7 is a flow diagram illustrating a method according to one embodiment of this invention.

FIG. 7 is a flow diagram illustrating one embodiment of this invention, through which a data processor determines or estimates spatial distribution of electric power outages and affected populations. Track 50 represents an application of the method of this invention for a weather event 52, such as a hurricane, tornado, earthquake/tsunami, or ice storm. In step 54, the data processor obtains weather event prediction information, such as from a prediction source or using a prediction module associated with the data processor. In step 56, the weather event prediction information, such as including a weather tracking path, is applied to the matrix to identify the possibly effected substations. In step 58, the data processor identifies the affected service areas by comparing the event path with the corresponding demand cells. In one embodiment of this invention, the expected path of the weather event is overlaid on the matrix to identify possibly affected demand cells and supply cells. In step 60, an estimated number of affected customers can be computed from the demand cell population information for the possibly affected cells.

Track 70 of FIG. 7 represents the methodology for other possible disaster events 72, such as wild fires, technological failures, attacks, etc. In track 70, there is no weather prediction as in step 54, and the method includes identifying the affected substations in step 74. After identifying the affected substations by comparing the disaster area to the matrix, track 70 proceeds to determining the affected service area using the matrix according to step 58. Step 62 includes any optional validation step. Step 64 represents an updating step to update and repeat the algorithm upon receiving updated prediction information.

In one embodiment of this invention, as shown by step 66 of FIG. 7, the method includes creating at least one of a restoration time estimate or a restoration plan proposal using the predicted effect and the matrix substation information. Power restoration for one or more service areas can be estimated by applying standardized repair crew information to power outage information generated using the matrix. The restoration prediction of the method of this invention desirably relies on standardized and/or historical data to estimate restoration time and/or to predict the number of repair crews that may be needed and the assessment of the event. Therefore, the restoration estimator of step 66 can be event dependent. The prediction changes as more information about the event becomes available. However, in one embodiment of this invention, the methodology desirably presumes one or more of the following: a) restoration starts from areas of least damage to areas of heaviest damage; b) restoration starts from densely populated areas to summer homes; c) restoration proceeds nonlinearly, and it is a function of the severity of the storm and the available resources; d) a standardized rule that it generally takes a crew of 8 technicians 8 hours to restore 1 substation, which is often called the 8-8-1 rule; e) a crew restores only one substation in a day; and/or f) restoration starts several hours after an event (usually 24 hours) depending on how large and strong the storm is.

Validation in step 62 can include comparing reported times for actual restoration to the predicted restoration times by subtracting the actual restoration time from the predicted restoration time on a cell-by-cell basis. Distributions can be calculated assuming a Gaussian distribution, and sources of degradation in precision and accuracy of the estimate(s) can be examined to see if the algorithm(s) or assumptions should be modified to improve the algorithm(s).

The methodology for estimating the restoration time according to one embodiment of this invention includes ranking impacted substations with respect to the number of a population served, while accounting for critical assets such as police and fire stations, hospitals, and government facilities. The method desirably develops a ramp and travel time table for the expected repair crews. Ramp time is the time it will take each crew to travel to the damage area, and travel time is the time taken to move between repairs. The method determines the number of crews available at the beginning of each day, and assigns crews to substations based on the developed priorities discussed above in the ranking step. These steps are desirably repeated until all substations are restored. The methodology is summarized in Table 1.

TABLE 1

Algorithm for Agent-Based Simulation of Power Outage Restoration Time

GIVEN the number of affected substations and where they are located;
GIVEN the number of electrical customers without power and where they are located;
GIVEN the number of utility companies that serve these customers;
GIVEN the number of available repair crew from each utility;
GIVEN how many hours each repair crew member works;
  for each utility company i = 1,. . .,p do
    Develop a ramp and travel time table for the expected repair crews
      (Ramp time is the time it will take each crew to travel to the
      damage area, and travel time is the time taken to move
      between repairs);
    Determine substations that serve critical assets such as police
      and fire stations, hospitals, and government facilities;
    Assign the first available repair crew to repair critical substations;
    Develop a substation priority list by ranking the remaining
      substations with respect to the number of customers
      they serve;
    Start the restoration process by assigning crews to substations
      at the beginning of each day based on the substations
      priority list;
    Repeat restoration process until all substations are restored;
  end for The present invention is described in further detail in connection with the following validation examples which illustrate or simulate various aspects involved in the practice of the invention. It is to be understood that all changes that come within the spirit of the invention are desired to be protected and thus the invention is not to be construed as limited by these examples.

The algorithm of this invention for associating demand cells to supply cells has been implemented for the entire USA, and the outputs have been validated using recent extreme weather events. For visualization of this product output, the VERDE (Visualizing Energy Resources Dynamically on Earth) platform (Oak Ridge National Laboratory) was used. VERDE is software that helps visualize the status of the electric transmission system infrastructure for North America. The real-time visualization that VERDE provides characterizes the dynamic behavior of energy resources, such as the electric grid, across multiple regions, substantially mitigating the risk of and accelerating the recovery from wide-area power disruptions. Major power outages in the United States over the past decade have been exacerbated by the lack of wide-area situational understanding of causes and impacts. This contributed to blackouts and difficulties in preparing for, and responding to, destructive events. VERDE addresses this problem. VERDE's novel approach of leveraging the commercial Google Earth® browser to display spatially and temporally tagged power system data has given traditional power utilities a new lens with which to view their system status. VERDE's software components describe the status of bulk of the transmission lines in Eastern Interconnection. Output layers from VERDE analysis and modeling components, the standard Google Earth layers, and external system feeds provide further valuable spatial context creating a dramatically more informative system view. Core VERDE capabilities include line descriptions and status of outage lines; analysis results and status predictions; geo-spatio-temporal information-impacts on population, transportation, and infrastructure; and weather impacts and overlays.

Four hurricanes of 2008—Dolly, Gustav, Hannah, and Ike—were used to validate the principles and use of the method and software of this invention. The number of customers estimated to lose power was estimated using the method and matrix of this invention with storm tracking information prior to landfall. The comparison of the projected (according to the invention at 96 hours before landfall) and actually observed number of customers without power for each hurricane is shown in Table 2. The examples allowed an observation that it is usually difficult to predict accurately around the edge of a storm, which resulted in some differences in number of people/customers. Even so, the projected number is a useful resource for the utility companies and emergency responders to plan for recovery and restoration.

TABLE 2

| Hurricane | Projected | Observed | Absolute Diff. | Percent Diff. |
|---|---|---|---|---|
| Dolly | 200,000 | 236,000 | 36,000 | −18.0% |
| Gustav | 1,830,000 | 1,820,000 | 10,000 | 0.5% |
| Hannah (NC) | 210,000 | 187,000 | 23,000 | 11.0% |
| Ike | 3,820,000 | 3,770,000 | 50,000 | 1.3% |

Figure 8:
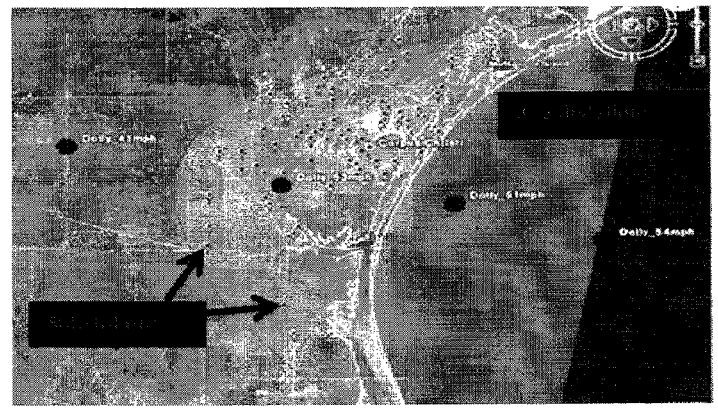
FIG. 8 is an image of a projected event and damage contour for hurricane Dolly of the year 2008.
Figure 9:
FIG. 9 is a projected spatial distribution of the population at risk due to hurricane Dolly.
Figure 10:
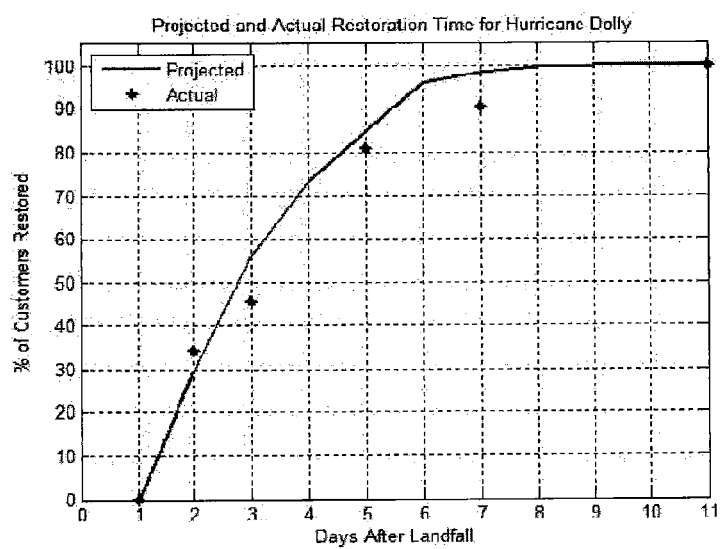
FIG. 10 shows a projected and actual restoration time for hurricane Dolly.
Figure 11:
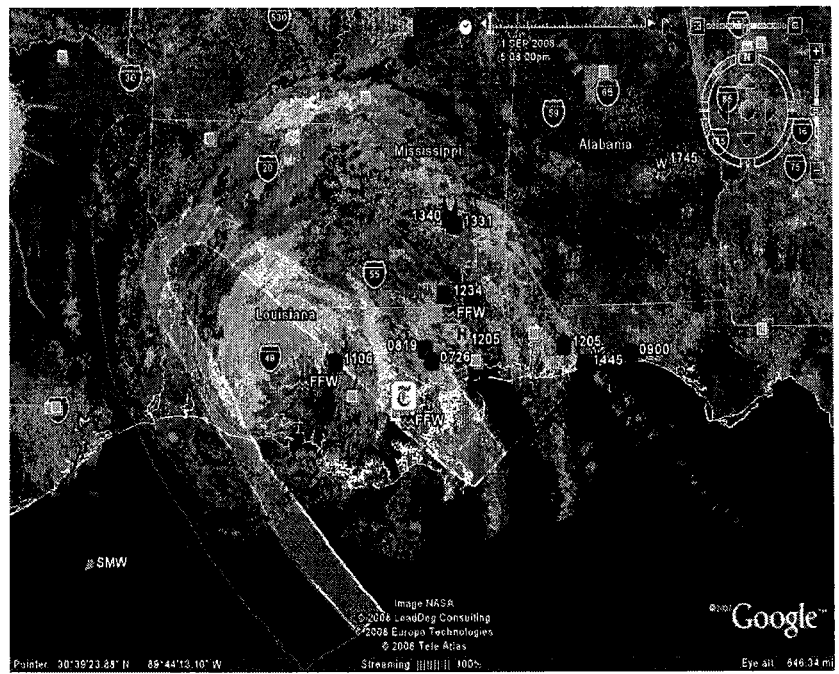
FIG. 11 is an image of a projected event and damage contour for hurricane Gustav of the year 2008 before landfall and during the storm
Figure 12:
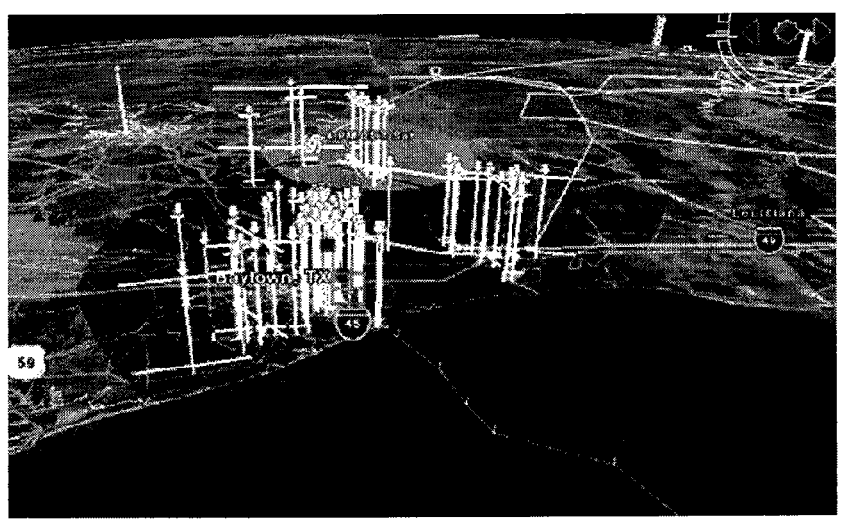
FIG. 12 is an image including a projected damage contour for hurricane Ike (shaded area) of the year 2008 and observed substation outages (poles).

FIGS. 8-12 show example images and graphs selected from the validation examples. Ninety-six hours before landfall of Dolly, it was estimated using the method of this invention that about 93 substations could be impacted. The track, damage contour, and identified substations are shown in FIG. 8. The spatial distribution of people that may lose power is shown in FIG. 9. The predicted and observed restoration time obtained from the matrix for the predicted impact areas are shown in FIG. 10. An overlay of hurricane Gustav and the predicted damage contour is shown in FIG. 11. An overlay of observed outages within VERDE and projected damage contour are shown in FIG. 12.

The method and matrix of this invention allow for geospatial modeling and visualization of a nation's ability to prepare and respond to natural disasters and other emergencies. The method provides a data product for estimating the spatial distribution of people/utility customers without power during severe weather events and the duration of the power outage. The methodologies of this invention use high-resolution population database and accurate geo-located substation data. The methodologies were validated using hurricanes from the year 2008, and the results demonstrate that the prediction would have been useful for enhancing emergency preparedness and restoration/recovery process prior and during those hurricanes.

While there has been shown and described what are at present considered the preferred embodiments of the invention, it will be obvious to those skilled in the art that various changes and modifications can be prepared therein without departing from the scope of the inventions defined by the appended claims.

What is claimed is:

1. A non-transitory recordable medium including a series of preprogrammed instructions that, when executed by a computing machine, cause the computing machine to perform the steps of modeling an electric supply and demand matrix, the steps comprising:
   a. creating an electric supply and demand matrix for a geographic area, the matrix including a plurality of cells each representing an electricity service area;
   b. assigning each existing substation for the geographic area to one of the cells in which the each existing substation is geographically located to create supply cells;
   c. determining an electric demand for each of the plurality of cells to create demand cells;
   d. assigning each of the demand cells to one of the supply cells as a function of proximity of the demand cells and an electricity supply of each of the supply cells;
   e. predicting an effect on an electricity service area using disaster event information with respect to the electric supply and demand matrix; and
   f. creating at least one of a restoration time estimate or a restoration plan proposal using the predicted effect and the electric supply and demand matrix.

2. The recordable medium of claim 1, further comprising instructions wherein step d) is repeated until each of the demand cells is assigned to one of the supply cells or until electricity supply capacity is exhausted.

3. The recordable medium of claim 1, wherein each of the cells measures approximately 0.01 decimal degrees per side.

4. The recordable medium of claim 1, wherein determining the electric demand for each of the plurality of cells comprises the computing machine constructing a per capita electric demand for each cell from peak commercial electricity demand sources and population data sources.

5. The recordable medium of claim 1, wherein determining the electric demand for each of the plurality of cells comprises the computing machine calculating a total population for each cell and constructing an electricity demand per cell by multiplying a sum of all electricity supplied by area substations by a ratio of a total cell population to a total state population.

6. The recordable medium of claim 1, wherein the geographic area comprises a state.

7. The recordable medium of claim 1, the steps further comprising the computing machine estimating a power outage by applying the disaster event information to the electric supply and demand matrix.

8. The recordable medium of claim 7, the steps further comprising the computing machine estimating a power restoration for a power outage by applying standardized repair crew information to power outage information generated using the electric supply and demand matrix.

* * * * *